J. F. FOSS.

Assignor of one-half Interest to J. M. PEVEY.

CARDING-MACHINE.

No. 7,399. Reissued Nov. 28, 1876.

WITNESSES

E. M. Gallaher

Geo. W. Browne

By

INVENTOR

John F. Foss,

J. S. Brown his Attorney.

THE GRAPHIC CO. N.Y.

UNITED STATES PATENT OFFICE.

JOHN F. FOSS, OF LOWELL, MASSACHUSETTS, ASSIGNOR OF ONE-HALF INTEREST TO JOHN M. PEVEY, OF SAME PLACE.

IMPROVEMENT IN CARDING-MACHINES.

Specification forming part of Letters Patent No. 166,089, dated July 27, 1875; reissue No. 7,399, dated November 28, 1876; application filed April 10, 1876.

*To all whom it may concern:*

Be it known that I, JOHN F. FOSS, of Lowell, in the county of Middlesex and State of Massachusetts, have invented an Improved Carding-Machine; and I do hereby declare that the following is a full and exact description thereof, reference being had to the accompanying drawings, making part of this specification—

Figure 1:
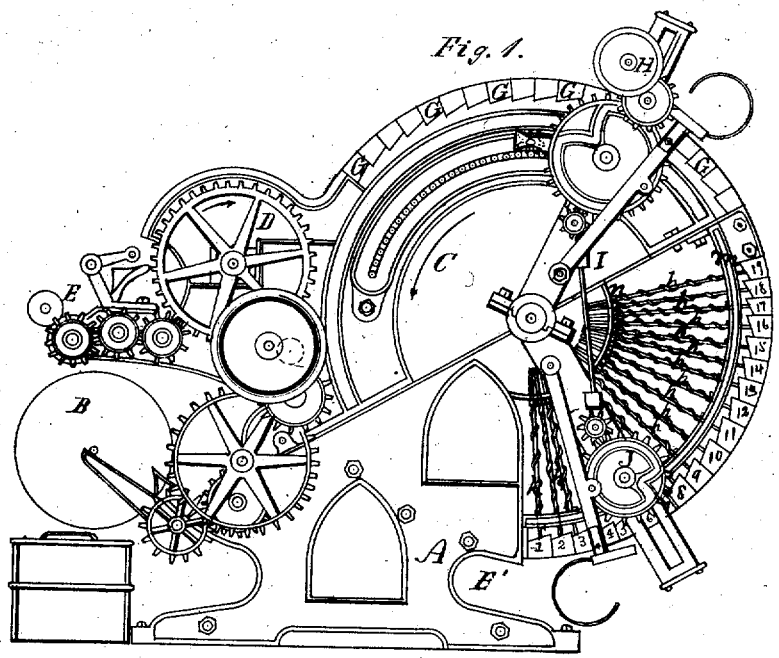
Figure 3:
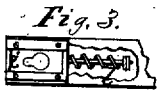
Figure 2:
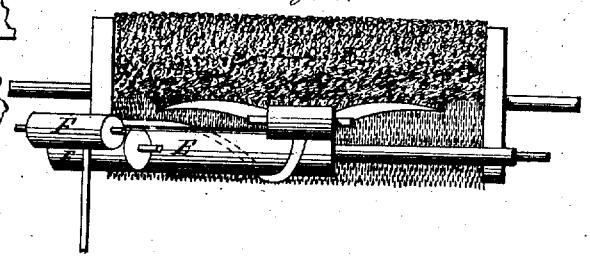
Figure 4:
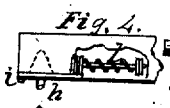
Figure 5:
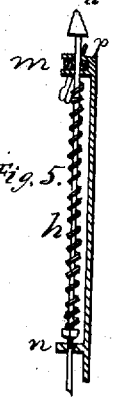

Figure 1 being a side elevation of my improved carding-machine; Fig. 2, a view of the doffer-trumpet and delivery-rolls in relative position as used on this carding-machine, showing the mode of conveying the sliver to one side of the machine, for clearing the lap placed and fed into the machine below the doffer and comb; Fig. 3, a view of the inner side of one end of one of the under flats; Fig. 4, an edge view of the same; Fig. 5, a radial section of the lower card-arch by the side of one of the guide-rods of the under flats.

Like letters designate corresponding parts in all of the figures.

My invention belongs to the class of carding-machines in which stationary working cards or flats are employed in connection with the revolving card-cylinder; and the main feature of the invention consists in combining, in one frame, and with the use of one card-cylinder, one doffer, one lap-feed, and the ordinary adjuncts thereof, substantially two machines, by the introduction of a set of under flats—that is, flats situated mostly or wholly below the central axial horizontal plane of the main cylinder, and having their own separate stripper, while the usual top flats are retained, having their own stripper. Thus these additional under flats, in connection with the main cylinder, do the work of the usual "breaker" card-machine, and the top flats, with the same card-cylinder, do the work of the usual "finisher" card-machine. The laps from the cotton-opener are fed to this machine the same as to the breaker-machine, and the machine produces a sliver substantially equal in quality to that produced by the finisher-machine, there being no doubler-laps formed, as ordinarily, intermediate between the breaker and finisher to feed to the latter. The strippings from the under flats are similar to those produced by the breaker, and the strippings from the top flats are similar to those of the ordinary finisher. This machine, therefore, does fully the work of the two ordinary carding-machines of like dimensions, and by this invention is saved one-half of the card-room required for the ordinary machines, the doubler and its attendants are dispensed with, and the room required therefor, and the power required to drive it, are saved; and since it requires but little more power to drive this machine than to drive either a breaker or finisher, the attendants of the breaker-machines is dispensed with, in addition to saving more than half of the usual room, nearly or quite one-half of the entire power, cost of attendance and oil for lubricating, with better results in a stronger yarn from the less working of the material, and consequent weakening and breaking of its fibers, besides other minor advantages which it is not necessary here to specify.

In the drawings, A represents one side of the frame or case of the machine; B, the lap-roll; C, the card-cylinder, uncovered to indicate the direction of its motion; D, the doffer; E, a roll to guide the sliver to one side of the machine; F F, delivery or calender rolls; G G, the top flats, and H the top-flat stripper.

Instead of applying the lap-roll and feed apparatus on the side opposite to the doffer side of the machine, as in the ordinary breaker and finisher machines, I locate them on the same side as and below the doffer, comb, and trumpet, in order that the cotton may be worked both under and over the card-cylinder, the sliver being delivered near one end of the doffer, as indicated in Fig. 2, to allow free room for putting the lap-roll in place. The gearing for communicating motion to these parts is arranged as represented in Fig. 1. The under flats 1, 2, 3, &c., up to a number generally equal to that of the top flats, are arranged on the case, below and back of the card-cylinder, beginning at a point about vertically under the cylinder-shaft, or as far forward as convenient, and extending backward and upward to a point about upon a level with or a little above a horizontal plane cutting the axis or central line of the card-cylinder, substantially as shown, leaving sufficient room between the two sets of flats to allow the operation thereof to be separate and unimpeded by each other. The position of these under flats being such that after each one is moved outward from the case or frame to be stripped, it cannot return to position by its own gravity, as do the top flats, it is necessary to apply a device for effecting this movement. I employ retracting-springs for this purpose on guide-rods, a spring and guide-rod, *h*, at each end of the machine being appropriated to each under flat. Each guide-rod is attached to its flat, so that it moves out and in therewith. Each flat is made detachable from its guide-rods, so that it may be removed from the machine without disturbing the guide-rods and springs.

My construction of detachable coupling is represented in Figs. 3 and 4. Each guide-rod has at its outer end a head with an abrupt shoulder, as represented. This head enters through a hole of equal size in a longitudinally-sliding plate, *i*, on the inner side of the flat, the flat being cut away beneath the plate to admit the head of the guide-rod. At the outermost edge of the plate-hole is a notch in the plate, as shown in Fig. 3, large enough to admit the diameter of the guide-rod. The plate is held down inward toward the middle of the flat by a spring, *l*. When the head of a guide-rod is inserted through the plate-hole it draws the plate outward against the action of the spring *l*; but as soon as the head passes through the plate the spring again draws the plate inward, thereby causing the notch at the side of the plate-hole to embrace the guide-rod and prevent its withdrawal from the flat. To detach the flat from its guide-rods each sliding plate *i* is drawn outward by hand (there being a lip, as shown in Figs. 3 and 4, at the outer end thereof, to catch hold of) until the plate-hole is concentric with the guide-rod head, when the latter can be withdrawn without impediment.

The guide-rods are mounted, and they slide longitudinally, in two arch-flanges, *m n*, on the end of the machine frame or case, as shown in Fig. 1, and by section in Fig. 5. The inner ends of the spiral springs press against stops on the guide-rods; and these stops are made adjustable on the guide-rods, for adjusting the flats inward as the teeth of the card-clothing on the inner surfaces of the flats and upon the card-cylinder wear shorter. The stops strike against the inner arch *n* to terminate the inward movement of the flats. The stripper H for the top flats is of ordinary construction, and the stripper J for the under flats is of like construction, being mounted, at each end of the machine, on a radial arm, joined to or connected with the arm of the top-flat stripper, so as to move simultaneously with it and by the same means. I also connect the cam-gear of the under-flat stripper with that of the stripper H by a pinion-shaft, I, having pinions at its two ends, to gear, respectively, into the cog-gearing of the two cams, substantially as represented in Fig. 1. Sufficient room, as at E, Fig. 1, is allowed under the machine for the operation of the under-flat stripper.

There is a special advantage incidental to the main improvement in this invention which gives it even superiority in the matter of cleaning the cotton and freeing it from motes over both the breaker and finisher machines. It is this, that while in the ordinary machines the cylinder first carries the cotton upward from the feed-rolls, and, during the whole operation of working it in connection with the top flats, the seeds, leaves, sand, and other impurities, as they fall from the fibers, lodge upon the card-cylinder, and stay there, or continually tend to work back into the cotton, in this improved machine the cylinder first carries the cotton downward from the feed-rolls, causing some of the impurities to fall through the grate beneath, without ever reaching the under flats, and the remainder, being worked out of the cotton while the cylinder is passing over the under flats, either falls between the card-strips of the flats or into the same, to fall out of the machine as often as the flats are moved out and stripped. The spaces between the flats thus especially become dirt-receivers, and the impurities interfere no more with the carding.

I am aware that "urchins" and "squirrels" have been used on the under side of top-flat carding-machines; these I do not claim, and they do not fulfill the purposes of my invention.

What I claim as my invention, and desire to secure by Letters Patent, is—

1. A carding-machine provided with under flats 1 2 3, substantially as and for the purpose herein specified.

2. In a carding-machine, the combination of under flats 1 2 3 and separate stripper J, with top flats G G and a top-flat stripper, H, substantially as and for the purpose herein specified.

3. The combination of an under flat and a guide-rod bearing it, substantially as and for the purpose herein specified.

4. The combination of an under flat and an inwardly-retracting spring, substantially as and for the purpose herein specified.

5. The attaching-plates *i i*, provided with springs *l l*, on the under flats, in combination with the shouldered guide-rods, substantially as and for the purpose herein specified.

JOHN F. FOSS.

Witnesses:

JOHN D. COLBY,

EUGENE M. HASKELL.